United States Patent [19]
Nyc

[11] 3,782,633
[45] Jan. 1, 1974

[54] REMOTE CONTROLLED, SELF-PROPELLED LAWN SPRINKLER

[76] Inventor: Wladimir Nyc, 4411 San Jose Blvd., Jacksonville, Fla. 32207

[22] Filed: May 13, 1971

[21] Appl. No.: 143,047

[52] U.S. Cl. ............................................. 239/191
[51] Int. Cl. ............................................. B05b 3/18
[58] Field of Search .................... 239/178, 183, 191, 239/177, 212; 137/344

[56] References Cited
UNITED STATES PATENTS
729,650   6/1903   Olofsson ............................. 239/191
3,128,047   4/1964   Rogers ............................. 239/191

Primary Examiner—M. Henson Wood, Jr.
Assistant Examiner—Michael Mar

[57] ABSTRACT

A remote controlled, self-propelled lawn sprinkling device for attachment to a water hose, comprising drive means powered by a water vane and a hydraulic piston arrangement for changing the direction of said lawn sprinkler, which is controlled by opening and closing the water supply spigot at the other end of said water hose.

1 Claim, 5 Drawing Figures

PATENTED JAN 1 1974 3,782,633

INVENTOR
WLADIMIR NYC

REMOTE CONTROLLED, SELF-PROPELLED LAWN SPRINKLER

The invention relates in general to devices for watering lawns and particularly to self-propelled lawn sprinkling devices.

This remote controlled, self-propelled lawn sprinkling device is unique in that once it is connected to any standard water hose, it may be directed to a desired exact location and the sprinkling operation may be started and stopped, all simply by the manipulation of the water supply spigot. With the use of this device, one may water his entire lawn without walking through wet grass and physically relocating a dripping sprinkler. This device will not sprinkle while traveling to the intended location. Then once it reaches the desired location, the device becomes stationary, and the sprinkling operation may be initiated. The device will remain stationary until the water supply is turned off or until relocation of the sprinkling device has begun.

It is the primary object of this invention to provide a device for watering a lawn whereby the device is self-propelled, remote controlled, and may be directed to any desired exact location without physically lifting and transporting the device to the desired location.

It is also an object of this invention to provide a device for watering a lawn whereby the device may be directed to the desired exact location and the sprinkling operation may be started and stopped at will, simply and completely, by the manipulation of the water supply spigot.

Other objects, together with the foregoing, are attained in the embodiment described in the following description and shown in the accompanying drawings in which.

Figure 1:
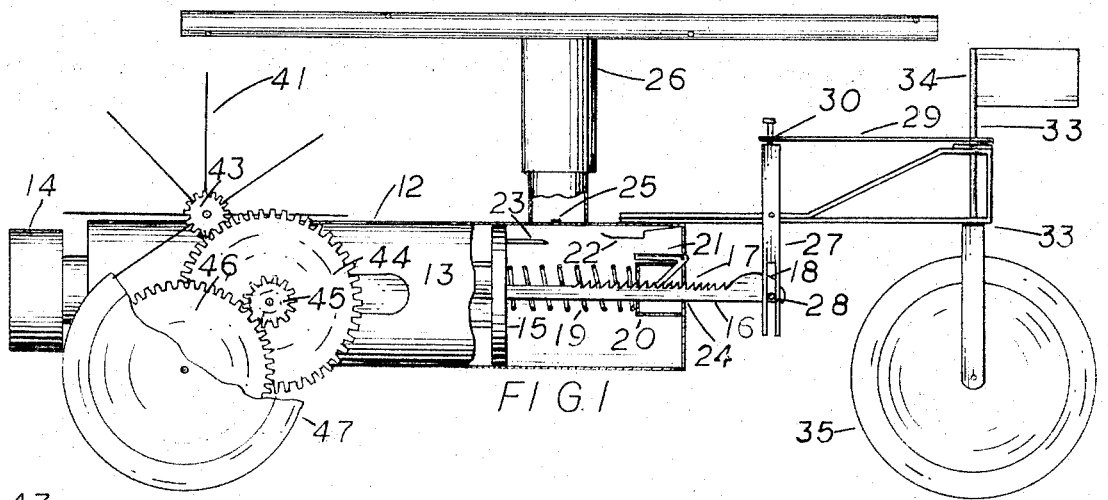
FIG. 1 is a side elevational view of the lawn sprinkling device, with portions being broken away to reveal certain interior detail.
Figure 2:
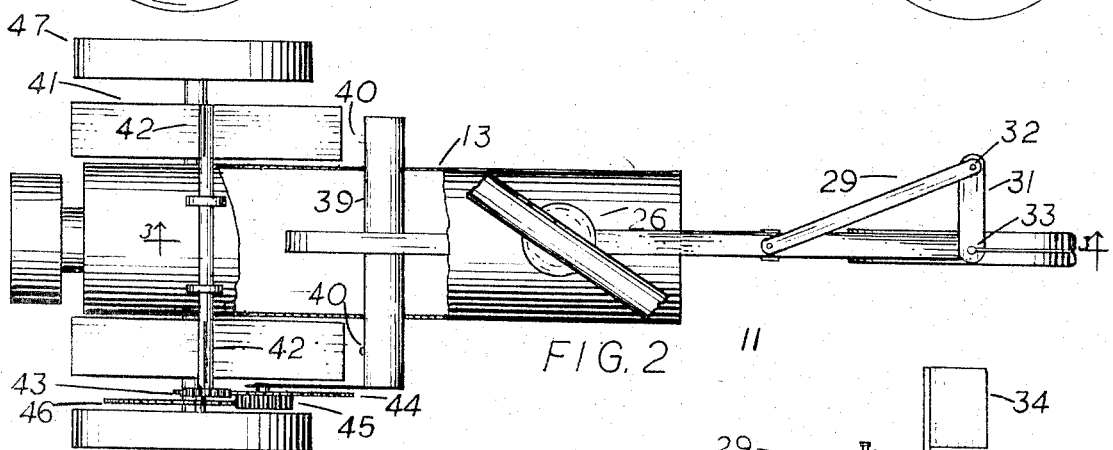
FIG. 2 is a top view of the lawn sprinkling device, with portions being broken away to reveal certain other interior detail.
Figure 3:
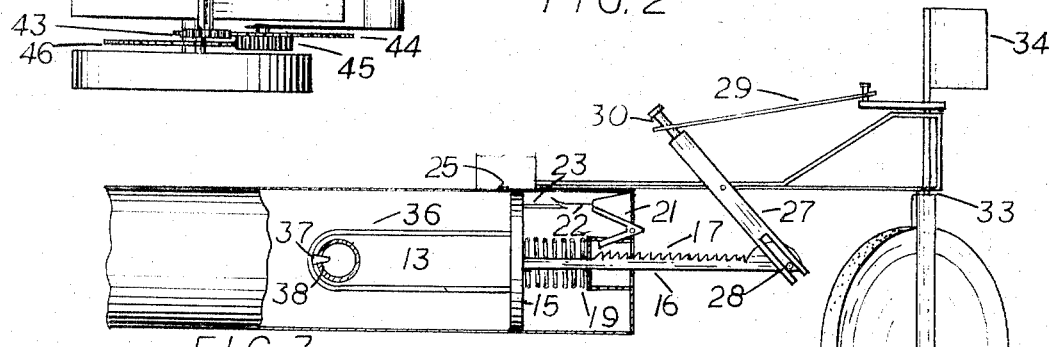
FIG. 3 is a transverse sectional view of the section being indicated by the line 3—3 in FIG. 2 with certain parts being taken away to reveal certain key parts during operation.

Referring now more particularly to FIG. 1, 2, and 3, the lawn sprinkling device generally designated by the reference numeral 11, comprises an elongated cylinder 12 defining a bore 13 with a standard hose connector 14 at one end. Cylinder 12 registers an opening 25 which leads to sprinkler arm 26. Piston 15, located inside bore 13, is an integral part of shaft 16, with a series of teeth 17, and with lifter cam 18 at one end. A spring 19 is located around shaft 16 between piston 15 and spring stop 20. Shaft lock 21 and shaft lock detainer spring 22 are located on inside end of cylinder 12. Shaft lock release pin 23 is affixed to piston 15. Shaft 16 extends through opening 24 of cylinder and connects to pivot rod 27 at slotted connector 28. Pivot rod 27 is connected to pusher arm 29 through connector pin 30. Wheel director bar 31 is connected to pusher arm 29 at connector pin 32 and is connected to wheel director shaft and fork 33. Member 34 is a wheel direction indicator, and member 35 is the front wheel. Member 36 is a frame connected to piston 15 and containing blocker pin 37. Hollow cylinder 39 registers an opening 38 at its central part and two water jets 40 at either end. Member 41 is a plurality of vanes connected to shaft 42. Driver gear 43 is affixed to end of shaft 42. Gears 44, 45, and 46 are connected in series with driver gear 43. Gear 46 is affixed to one of the rear wheels 47.

Figure 4:
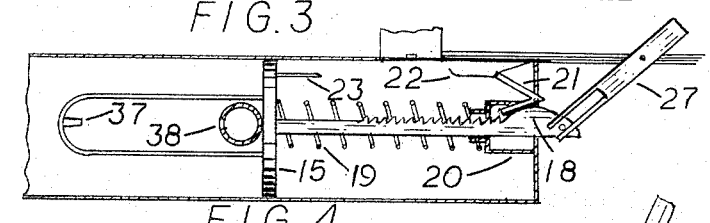
FIG. 4 is also a transverse sectional view of the same section being indicated by the line 3—3 in FIG. 2 with certain parts taken away to reveal same key parts during a later phase of operation.
Figure 5:
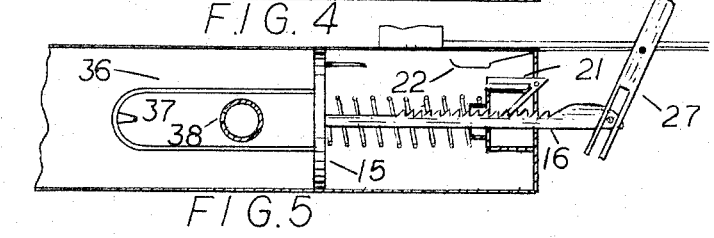
FIG. 5 is still another transverse sectional view of the same section being indicated by the line 3—3 in FIG. 2 with certain parts being taken away to reveal same key parts during a still later phase of operation.

Referring now to the drawings in detail, the following is an explanation of how the lawn sprinkling device is intended to function:

A standard water hose is connected to hose connector 14. When the water supply is off, spring 19 is fully expanded. Piston 15 and shaft 16 are all the way to the left causing lifter cam 18 to raise shaft lock 21 up until engaged with shaft lock detainer spring 22. Note that shaft lock 21 is now well clear of teeth 17 as shown in FIG. 4. When the water supply spigot is turned on, water enters elongated cylinder 12 and water pressure acts against left side of piston 15. When water pressure is sufficient to compress spring 19, piston 15 and shaft 16 moves all the way to the right until spring 19 is fully compressed. Shaft 16, when moving to the right, pushes pivot rod 27, causing pusher arm 29, wheel director bar 31, and wheel director shaft and fork 33 to rotate the front wheel 35 to the maximum counter-clockwise direction. Piston 15, when all the way to the right, causes shaft lock release pin 23 to slightly raise shaft lock detainer spring 22, allowing the shaft lock 21 to fall. Now if the water supply spigot is slightly closed, reducing the flow of water sufficiently to allow spring 19 to override water pressure acting on left side of piston 15, then piston 15 and shaft 16 will begin moving slowly to the left. As shaft 16 moves to the left, pivot rod 27 is pulled slowly, causing pusher arm 29, wheel director bar 31, and wheel director shaft and fork 33 to rotate front wheel 35 slowly in a clockwise direction. The operator may note the direction of the front wheel since the wheel direction indicator 34 is always in alinement with the front wheel. When the desired direction is attained, the water supply spigot is opened full. Now shaft lock 21 will engage teeth 17, restricting any movement of shaft 16 thereby maintaining the selected direction of the front wheel. Now all water pressure acting against the left side of piston 15 is diverted through opening 38 into hollow cylinder 39 and out water jets 40. Water exiting the water jets is directed against the plurality of vanes 41 so as to achieve maximum torque on shaft 42. Shaft 42, through driver gear 43 and gears 44, 45, and 46 turns the rear wheels 47 in a clockwise direction thereby propelling the lawn sprinkling device in a forward direction. When the lawn sprinkling device has reached the desired location, the water supply spigot is turned to the off position. Again, spring 19 expands fully, causing piston 15 and shaft 16 to move all the way to the left. Lifter cam 18 lifts shaft lock 21 up until the shaft lock is engaged with shaft lock detainer spring 22. The shaft lock is now clear of teeth 17. Now the lawn sprinkling device is in the desired location and the sprinkling operation may begin. The water supply spigot is opened full, compressing spring 19 fully, and causing piston 15 and shaft 16 to move all the way to the right as shown in FIG. 3. As long as the water supply is left open to provide sufficient water pressure to keep spring 19 compressed, the piston will remain all the way to the right. With the piston in this position, blocker pin 37 prevents the water from entering opening 38 and exiting through water jets 40. Thus all the water is now diverted through opening 25 and into sprinkler arm 26. Note that only when the piston is in this position, the flow of the water to the propulsion system is blocked and also, only when the piston is in this position can the water in elongated cylinder 12 be diverted through opening 25 and into sprinkler arm 26.

To reposition the lawn sprinkling device, simply turn the water supply spigot to the off position and repeat the above operation.

From the foregoing, it can be seen that this remote controlled, self-propelled lawn sprinkling device may be directed to any desired location and the lawn sprinkling operation may be started and stopped, all simply by the manipulation of the water supply spigot.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling into the scope of the invention as claimed.

What is claimed is:

1. A remote controlled, self-propelled lawn sprinkling device for attachment to a standard water hose attached to a water supply spigot, comprising:
   1. An elongated cylinder forming a housing for a piston and a spring whereby said piston is moved back and forth transversely inside said cylinder by the force of water pressure acting against one side of said piston and the force of said spring acting against the opposite side of said piston,
   2. A front wheel and a pair of rear wheels for supporting said cylinder, in which movement of said piston through a connection of rods and bars will change the direction of the front wheel of said lawn sprinkling device,
   3. A shaft attached to one side of said piston through coils of said spring, the other end of said shaft being attached to said rods and bars,
   4. A shaft lock engageable when the aforesaid piston is at the extremity of one transverse movement and disengageable when said piston is at the extremity of another transverse movement, said shaft lock securing the desired position of aforesaid piston thereby maintaining the selected direction of the front wheel of the lawn sprinkling device,
   5. A plurality of water vanes,
   6. A pressure chamber in said cylinder for providing a source of pressurized water to openings in spray bar for producing water jets which are directed against said water vanes for creating a torque which is used to propel the lawn sprinkling device in a forward direction,
   7. said cylinder providing a pressure chamber whereby water may be directed through openings and into a sprinkling arm which will distribute water on a lawn, whereby said device may be directed to an exact desired location and the sprinkling operation may be started and stopped, all simply and completely, by the manipulation of the water supply spigot.

* * * * *